United States Patent [19]
Kiyota

[11] 4,061,118
[45] Dec. 6, 1977

[54] CARBURETOR SYSTEM FOR MULTICYLINDER ENGINE

[75] Inventor: Yuhiko Kiyota, Nagaokakyo, Japan

[73] Assignee: Mitsubishi Jidosha Kogyo Kabushiki Kaisha, Japan

[21] Appl. No.: 697,125

[22] Filed: June 17, 1976

[30] Foreign Application Priority Data
June 24, 1975 Japan .................................. 50-78131

[51] Int. Cl.² ........................ F02M 13/06; F02B 33/00
[52] U.S. Cl. .............................. 123/119 LR; 123/127; 123/119 AC; 60/276
[58] Field of Search .......... 123/119 EC, 127, 119 LR, 123/119 R; 60/276, 285

[56] References Cited
U.S. PATENT DOCUMENTS

| | | | |
|---|---|---|---|
| 3,827,237 | 8/1974 | Linder | 60/276 |
| 3,963,002 | 6/1976 | Sueishi | 123/32 EA |

Primary Examiner—Ronald B. Cox
Attorney, Agent, or Firm—Robert E. Burns; Emmanuel J. Lobato; Bruce L. Adams

[57] ABSTRACT

A carburetor system for us in a multicylinder engine comprises a carburetor having a main fuel-air mixture supply device to supply a mixture leaner than stoichiometric to at least one first cylinder and a corresponding number of second cylinder. A rich mixture supply device, integrated into the carburetor, has a rich mixture forming passage to make a mixture richer than stoichiometric. The main mixture supply device communicates with the first and second cylinders by a first passage, while the rich mixture forming passage with the second cylinder by a second passage. A first, second and third valves are provided in the first, second and rich mixture forming passages, respectively. These valves respectively are opened and closed by a first, second and third valve actuation devices, which are in turn regulated by an operation control device. Depending on the engine operating range and driving conditions, this carburetor system supplies a rich mixture to the second cylinder to raise the fuel-air ratio in it. By thus feeding both lean and rich mixtures to the engine, this system purifies its exhaust gases.

7 Claims, 5 Drawing Figures

CARBURETOR SYSTEM FOR MULTICYLINDER ENGINE

DETAILED DESCRIPTION OF THE INVENTION

This invention relates to a carburetor system for use in an engine having a cylinder to which a rich fuel-air mixture is supplied (hereinafter called the "R-cylinder") and a cylinder to which a lean fuel-air mixture is supplied (hereinafter called the "L-cylinder").

Generally an automotive engine is designed so that the ratio of air to fuel (hereinafter called the "air-fuel ratio") in the mixture supplied to its every cylinder can be as uniform as possible. With such uniformly distributed mixture, the engine consumes the least fuel but give emissions with high NOx concentration at partial load. During high-load operation with substantially fully opened throttle valve, a rich mixture with a low air-fuel ratio must be supplied to maintain high power output. The resultant exhaust gases contain much unburned CO and HC. Further, when the engine rotates at low speed, the mixture does not perfectly burn in the cylinders because of unwarmed-up cylinder walls and other reasons. Then the engine emits noxious exhaust gases containing large quantities of unburned CO and HC.

As is known well, CO and HC concentrations in exhaust gases can be lowered by efficiently combusting the mixture at high temperature, with sufficient supply of air. But the concentration of NOx increases with rising combustion temperature. To decrease NOx, therefore, combustion temperature should be lowered.

To summarize, an ordinary internal combustion engine exhibits the following three emission characteristics.

1. Low NOx concentration results from rich and lean mixtures.
2. High CO and HC concentrations result from rich mixture.
3. Low CO and HC concentrations as well as high oxygen concentration result from lean mixture, if no misfire occurs.

Giving attention to these features, the inventor proposed a multicylinder engine comprising a plurality of cylinders divided into a group to burn a rich mixture and the other to burn a lean mixture, which are all connected to a single carburetor through a single intake manifold. This engine solves the problem of oxygen shortage in exhaust gases, supplying little or no emission purifying secondary air. To be more precise, part of the mixture used in this engine contains enough oxygen to recombust or reoxidize the unburned HC and CO in the exhaust gases, which leads to effective reduction in HC and CO, and even NOx emission. This invention relates to a carburetor system for use in a multicylinder engine of the above-described type which comprises main mixture supply means to supply a lean mixture to all of said cylinders, separately provided rich mixture supply means to supply a rich mixture to said group of rich-mixture burning cylinders, a fuel addition passage having a first passage to supply fuel to said rich mixture supply means and a second passage to supply fuel to said main mixture supply means, a first and second valves respectively provided in said first and second passages, a first and second valve actuating means to respectively open and close said first and second valves, and operation control means to regulate said first and second valve actuating means.

Now an embodiment of this invention will be described hereunder, referring to the accompanying drawings in which.

Figure 5:
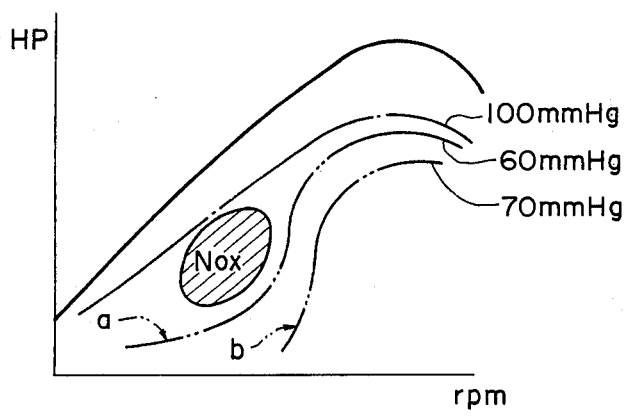

FIG. 5 plots power output curves.

In this embodiment, the rich mixture supply device and the carburetor are integrated into a single unit. Among other features, it has two slow-jet systems, a first and a second. The main and the first slow-jet systems jointly make and supply a lean mixture to all cylinders, while the second slow-jet system makes and supplies a rich mixture to a branch of said intake manifold intercommunicating with the R-cylinders.

Reference numeral 1 designates a carburetor connected to an intake manifold 7 which intercommunicates with a first to fourth cylinders 3, 4, 5 and 6 of an engine 2. The intake manifold 7 has branches 8 and 9 leading to the R-cylinders 4 and 5 and branches 10 and 11 leading to the L-cylinders 3 and 6. An exhaust manifold 12 is connected to the cylinders 3, 4, 5 and 6 and serves as a thermal reactor to recombust exhaust gases.

Reference character B indicates rich mixture supply means integrally provided with the carburetor 1. In this embodiment, the second slow-jet system, which is usually provided in the carburetor, is utilized as that means. More particularly, the carburetor 1 has main mixture supply means A, which comprises a primary mixture passage 14, a secondary mixture passage 15 and a first slow-jet system 16 and supplies a lean fuel-air mixture to all cylinders 3, 4, 5 and 6. It also has the rich mixture supply means B in which a second slow-jet system is utilized as a fuel addition passage 17. Item 18 as a primary main nozzle in a venturi 19 provided in said primary mixture passage 14, item 20 a secondary main nozzle in a venturi 21 provided in said secondary mixture passage 15, item 22 a primary throttle valve, item 23 a secondary throttle valve, and item 24 a choke valve.

Reference numeral 25 denotes a rich mixture forming passage which is connected to the R-cylinder branches 8 and 9 of the intake manifold 7, or to the intake ports of the R-cylinders, through communicating passages 13. Item 26 is a throttle valve which is provided in said passage 25, and operates interlockingly with said throttle valve 22 as indicated by a broken line in FIG. 3. Item 27 is a slow jet to supply fuel from a float chamber, not shown, to said first slow-jet system 16 and fuel addition passage 17. Item 28 is a pilot screw fitted into a slow port 29 at the lowest end of said first slow-jet system 16, while item 30 is a pilot screw fitted into a port 31 at one extremity of said fuel addition passage 17. The fuel addition passage 17 consists of a first passage 17-1 through which additional fuel is supplied to said rich mixture forming passage 25 and a second passage 17-2 to supply fuel to the main mixture supply means A, opening into said primary mixture passage 14.

Item 32 is a solenoid to actuate a needle valve 33 which opens and closes said first passage 17-1, item 34 is a solenoid to actuate a butterfly valve 35 which opens and closes said rich mixture forming passage 25, and item 36 is a solenoid to actuate a needle valve 37 which opens and closes said second passage 17-2. Arranged in series and connected to a power supply 70 through operation control means 38 as needed, the three solenoids 32, 34 and 36 operate simultaneously.

Figure 4:
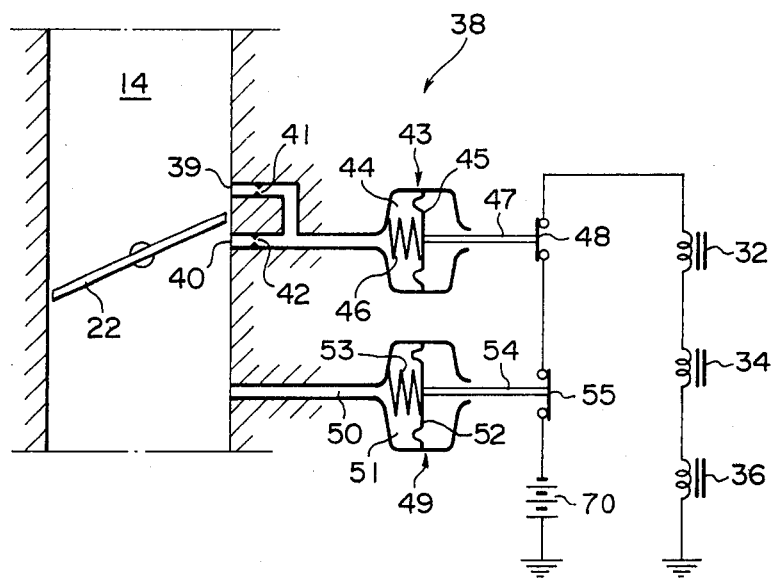
FIG. 4 is a diagrammatic representation of the operation control means of the carburetor in FIG. 3.

As stated above, an ordinary automotive engine is designed to supply mixtures with as uniform mixture or air-fuel ratio as possible to its cylinders. But such engine emits maximum NOx during part-load operation which is indicated by a hatched portion in the power output diagram of FIG. 5. A mixed vacuum prepared, as shown in FIG. 4, by supplying different vacuums from a first vacuum passage 39 opening upstream of the throttle valve 22 and a second vacuum passage 40 opening downstream thereof, respectively through constrictions 41 and 42, changes as indicated by two-dot-dash lines $a$ and $b$ in FIG. 5 when said constrictions are made to have a certain diameter. Taking advantage of this fact, the operation control means 38 aims at precluding NOx emission in the range between such mixed vacuum and a certain intake manifold vacuum indicated by a dot-dash-line, supplying a rich and a lean mixture to the R- and L-cylinders, respectively. Reference numeral 43 designates a diaphragm unit having a diaphragm 45, which forms a vacuum chamber 44 to which the mixed vacuum is supplied from the first and second vacuum passages 39 and 40, and a spring 46 to urge said diaphragms 45. The diaphragm 45 has a contact 48 at the end of a rod 47 extended therefrom. Item 49 is a diaphragm unit having a diaphragm 52, which defines a vacuum chamber 51 to which a vacuum is supplied from a manifold vacuum passage 50 intercommunicating with the intake manifold, and a spring 53 urging said diaphragm 52. This diaphragm 52 also has a contact 55 at the end of a rod 54.

Figure 1:
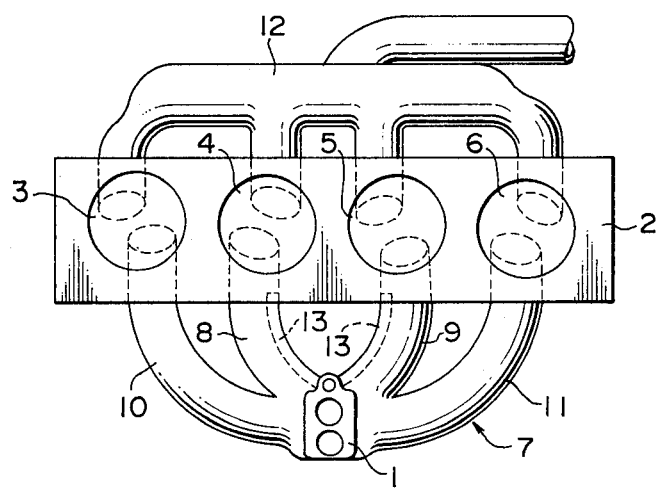
FIG. 1 is a schematic illustration of an embodiment of this invention.
Figure 2:
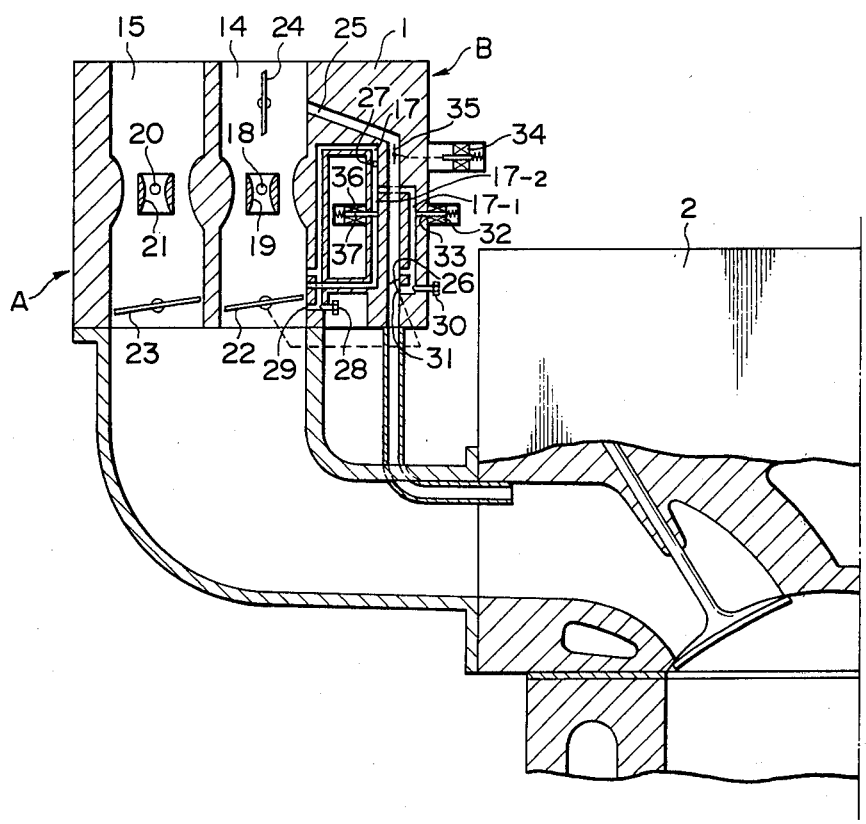
FIG. 2 is a cross-sectional view showing a part of FIG. 1.
Figure 3:
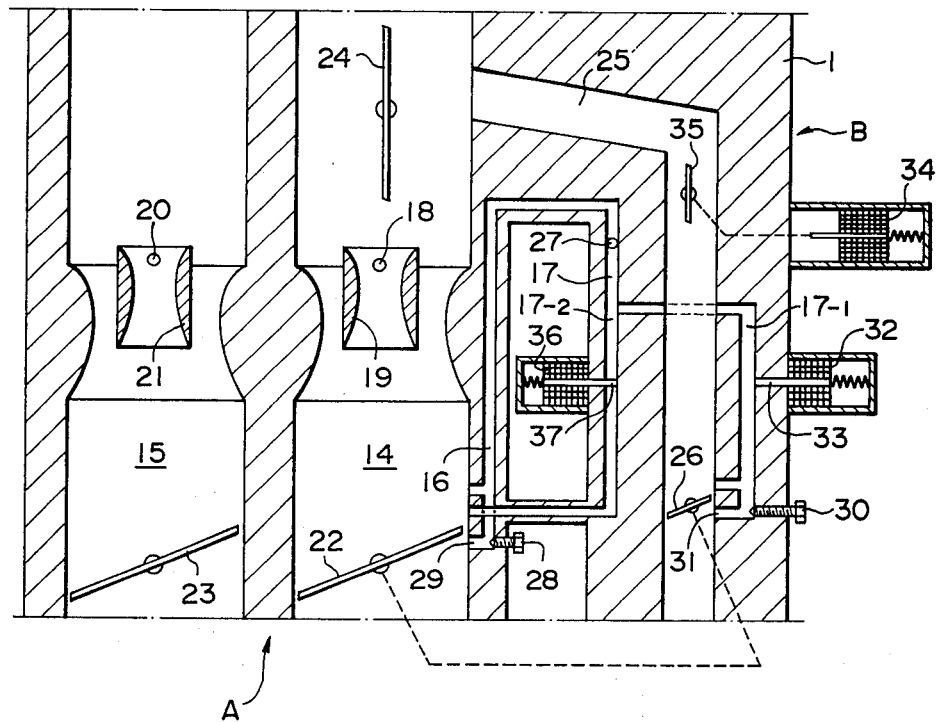
FIG. 3 is an enlarged view of the carburetor portion in FIG. 2.

FIG. 4 shows an operating condition below a certain mixed vacuum, e.g., 60 mmHg, indicated by the two-dot-dash line $a$ of FIG. 5, or above a certain intake manifold vacuum, e.g., 100 mmHg, indicated by the dot-dash line. Under this condition, both contacts 48 and 55 close to pass current to the solenoids 32, 34 and 36, which respectively actuate the needle valve 33, butterfly valve 35 and needle valve 37 as shown in FIG. 3.

This embodiment having the above-described structure operates as described hereunder. In the above-mentioned range between the intake manifold vacuum and mixed vacuum, including the hatched area in FIG. 5 where NOx emission is particularly liable to occur, the operation control means 38 operates as shown in FIG. 4 to energize said solenoids 32, 34 and 36 which then actuate said needle valve 33, butterfly valve 35 and needle valve 37 as illustrated in FIG. 3. On this occasion, the main mixture supply means A supplies a lean mixture with an air-fuel ratio of, for example, 18 to 20 to the L-cylinders 3 and 6. Meanwhile, the R-cylinders 4 and 5 are supplied with a mixture having an air-fuel ratio of 12 to 13, which is a mixture of said mixture with 18 to 20 air-fuel ratio supplied from the main mixture supply means A and a richer mixture supplied from the rich mixture supply means B. To summarize, a lean mixture with 18 to 20 air-fuel ratio is supplied to the L-cylinders and a rich mixture with 12 to 13 air-fuel ratio to the R-cylinders within the range between the dot-dash-line and the two-dot-dash-line $a$, as a consequence of which combustion with reduced NOx, HC and CO emissions is accomplished.

Out of that range, i.e., where NOx is not readily emitted, the contact 48 or 55 opens to deenergize said solenoids 32, 34 and 36, whereupon the needle valve 33 and butterfly valve 35 close and the needle valve 37 opens. At this time, the main mixture supply means A, supplied with fuel to make an ordinary lean mixture and additional fuel from the fuel addition passage 17, delivers a mixture with an air-fuel ratio of approximately 14 to all cylinders.

In brief, this embodiment reduces NOx emission during the partial load operation when much NOx is liable to be emitted, by supplying a lean and rich mixture to the L- and R-cylinders, respectively. During the high load or high rotation operation when unburned HC and CO are liable to increase, it supplies a mixture with an air-fuel ratio of approximately 14 to both L- and R-cylinders, thereby reducing such unburned materials and improving drivability.

In this embodiment, the operation control means is a diaphragm unit which is operated by the mixed and intake manifold vacuums and actuates said valves through its contact. Also, a thermovalve or other like means, which operates on detecting engine overheat, may suitably be provided in the operation control means.

What is claimed is:

1. A carburetor system for use in a multicylinder engine which comprises a carburetor having a main fuel-air mixture supply device to supply a mixture leaner than stoichiometric to at least one first cylinder and at least one second cylinder, a rich mixture supply means, integrated into the carburetor, having a rich mixture forming passage to make a mixture richer than stoichiometric, a first passage means to connect the main mixture supply means with the first and second cylinders, a second passage means to connect the rich mixture forming passage with the second cylinder, a fuel addition passage having a first fuel passage to supply fuel to the rich mixture forming passage and a second fuel passage to the main mixture supply means, means to actuate a first and second valve respectively provided in said first and second fuel passage, means to actuate a third valve in said rich mixture forming passage, and operation control means for said first, second and third valves.

2. A carburetor system for a multicylinder engine according to claim 1, wherein the operation control means closes the second valve when the first and third valves are open, and vice versa.

3. A carburetor system for a multicylinder engine according to claim 1, wherein a throttle valve in the main mixture supply means and a throttle valve in the rich mixture forming passage are interlocked.

4. A carburetor system for a multicylinder engine according to claim 1, which comprises a slow-jet passage to supply fuel to the main mixture supply means, a first fuel passage to supply additional fuel, whose one end communicating with said slow-jet passage and other end with the rich mixture forming passage, and a second fuel passage to supply additional fuel, whose one end communicating with the slow-jet passage and other end with the rich mixture forming passage.

5. A carburetor system for a multicylinder engine according to claim 1, wherein the first and third valves open and the second valve closes, and vice versa, when the temperature of the engine cooling water, exhaust system or atmosphere reaches the desired level.

6. A carburetor system for a multicylinder engine according to claim 2, wherein solenoids are used as the valve actuating means and the operation control means comprises a diaphragm switch operated by a mixture of vacuums supplied from upstream and downstream of the throttle valve in the carburetor and a diaphragm switch operated by a vacuum from downstream of the carburetor throttle valve, which are connected in series with said solenoids and a power supply.

7. A carburetor system for a multicylinder engine according to claim 6, wherein the first and second valves are needle valves and the third valve is a butterfly valve.

* * * * *